United States Patent
Portigal et al.

(10) Patent No.: US 7,450,761 B2
(45) Date of Patent: Nov. 11, 2008

(54) SPECTRAL GEOGRAPHIC INFORMATION SYSTEM

(75) Inventors: Fred Portigal, Albuquerque, NM (US); Rastislav Telgarsky, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 754 days.

(21) Appl. No.: 10/979,514

(22) Filed: Nov. 2, 2004

(65) Prior Publication Data
US 2006/0093223 A1    May 4, 2006

(51) Int. Cl.
G06K 9/46       (2006.01)
G06K 9/00       (2006.01)
G06F 17/30      (2006.01)

(52) U.S. Cl. .................... 382/191; 382/103; 382/113; 707/E17.018

(58) Field of Classification Search ............. 382/103, 382/113, 181, 190, 191, 232; 348/144; 702/5; 707/E17.018
See application file for complete search history.

(56) References Cited

U.S. PATENT DOCUMENTS

| 5,978,804 | A | * | 11/1999 | Dietzman | 707/10 |
| 6,243,483 | B1 | * | 6/2001 | Petrou et al. | 382/103 |
| 6,282,301 | B1 | * | 8/2001 | Haskett | 382/103 |
| 6,356,646 | B1 | | 3/2002 | Spencer | |
| 6,771,798 | B1 | * | 8/2004 | Haas et al. | 382/103 |
| 6,804,400 | B1 | * | 10/2004 | Sharp | 382/239 |
| 6,892,204 | B2 | * | 5/2005 | Haas et al. | 707/100 |
| 7,103,451 | B2 | * | 9/2006 | Seal et al. | 700/284 |
| 7,149,366 | B1 | * | 12/2006 | Sun | 382/284 |
| 7,177,882 | B2 | * | 2/2007 | Xie et al. | 707/104.1 |
| 2004/0213459 | A1 | * | 10/2004 | Ishimaru et al. | 382/191 |
| 2005/0195096 | A1 | * | 9/2005 | Ward et al. | 340/995.14 |

OTHER PUBLICATIONS

Bowles, Jeffrey, Wei Chen, and David Gillis. "ORASIS framework—benefits to working within the linear mixing model." Geoscience and Remote Sensing Symposium, 2003. IGARSS '03. Proceedings 1(2003): 96-98.*
Mitchell, Peter A. "Hyperspectral digital imagery collection experiment (HYDICE)." Proceedings of SPIE 2587(1995): 70-95.*
ESRI. (1998). ESRI Shapefile Technical Description. White paper.*
Gillis, David, Peter Palmadesso, and Jeffrey Bowles. "Automatic target-recognition system for hyperspectral imagery using ORASIS." Algorithms for Multispectral, Hyperspectral, and Ultraspectral Imagery VII, Proceedings of SPIE 4381(2001): 34-43.*

(Continued)

Primary Examiner—Samir A Ahmed
Assistant Examiner—Michael A Newman
(74) Attorney, Agent, or Firm—Duke W. Yee; Charles S. Gumpel; Theodore D. Fay, III

(57) ABSTRACT

A system for the conversion, analysis and display of geographic imaging data is provided which allows for the efficient location of various targets based on user selectable search criteria. The system provides a means to convert large image database information to a more compact and efficient structure employing the use of a shape library and an associated shape index.

9 Claims, 8 Drawing Sheets

OTHER PUBLICATIONS

ESRI. (1998). ESRI Shapefile Technical Description.*

Marchisio, Giovanni B., Krzysztof Koperski, and Michael Sanella. "Querying Remote Sensing and GIS Repositories with Spatial Association Rules." Geoscience and Remote Sensing Symposium, 2000. Proceedings. IGARSS 2000. IEEE 2000 International 7(2000): 3054-3056.*

Marchisio, Giovanni B., Wen-Hao Li, Michael Sanella, and Jill R. Goldschneider. "GeoBrowse: an integrated environment for satellite image retrievaland mining." Geoscience and Remote Sensing Symposium Proceedings, 1998. IGARSS '98. 1998 IEEE International. 2(1998): 669-673.*

R. Aspinall et al.: "Consideration in collecting, processing, and analysing high spatial resolution hyperspectral data for environmental investigations", Journal of Geographical Systems, vol. 4, No. 1, Mar. 2003, pp. 15-29, XP002385417.

Applied Coherent Technology Corporation: "WIPE Overview", Jul. 24, 2003, retrieved from internet: http://www.actgate.com/home/products/wipe_overview.pdf, 8 pages, XP002385408.

Nichols C R et al.: "Adapting an enhanced multiple database integration and update capability to support coastal operations", Oceans, 2001, MTS/IEEE Conference and Exhibition Nov. 5-8, Piscataway, NJ, USA, IEEE, vol. 4, pp. 2436-2444, XP010566816.

Palacios-Orueta Alicia et al.: "Remote sensing of soils in the Santa Monica Mountains: II. Hierarchical foreground and background analysis", 1999, Remote Sens Environ; Remote Sensing of Environment, Elsevier Science Inc., New York, NY, USA, vol. 68, NR. 2, pp. 138-151, XP002385426.

ESRI Corporation: "ESRI shapefile technicial description", Jul. 1998, retrieved from internet: www.esri.com/library/whitepapers/pdfs/shapefile.pdf, 34 pages, XP002385424.

International Search Report dated Jun. 28, 2006.

* cited by examiner

SPECTRAL GEOGRAPHIC INFORMATION SYSTEM

BACKGROUND OF THE INVENTION

This invention relates to a system specifically adapted for use in spectral geographic information systems. More particularly, this invention relates to a system configured to translate large information databases into a more compact database for analysis using various hyperspectral techniques to facilitate the location of targets.

Hyperspectral imagery consists of hundreds of "spectra," or measurements of reflected or emitted energy. Hyperspectral sensors scan many channels across a relatively narrow bandwidth and provide detailed information about target spatial and spectral patterns. Absorption and emission bands of given substances often occur within very narrow bandwidths. They allow high-resolution, hyperspectral sensors to distinguish the properties of the substances to a finer degree than an ordinary broadband sensor. The intensity of this energy can be measured at various wavelengths. Many objects and substances have spectral characteristics that are unique and a unique spectral "signature" allows that object or substance to be identified through various spectral analyses. By using sensors to detect multiple wavelengths, it's possible to differentiate between natural and manmade objects—even different kinds of vegetation and various types of building materials.

The utility of subdividing the ultraviolet, visible and infrared spectra into distinct bins for imaging has long been known. In multispectral imaging (MSI), multiple images of a scene or object are created using light from different parts of the spectrum. If the proper wavelengths are selected, multispectral images can be used to detect many militarily important items such as camouflage, thermal emissions and hazardous wastes to name a few.

A primary goal of using multispectral/hyperspectral remote sensing image data is to discriminate, classify, identify as well as quantify materials present in the image. Another important application is subpixel target detection, which allows one to detect targets of interest with sizes smaller than the pixel resolution, and abundance estimation, which allows one to detect concentrations of different signature spectra present in pixels. In remote sensing image analysis, the difficulty arises in the fact that a scene pixel is mixed linearly or nonlinearly by different materials resident in the pixel where direct applications of commonly used image analysis techniques generally do not work well.

Hyperspectral imaging (HSI), is a passive technique (i.e., depends upon the sun or some other independent illumination source) that creates a large number of images from contiguous, rather than disjoint, regions of the spectrum, typically, with much finer resolution. This increases sampling of the spectrum and provides a great increase in information. Many remote sensing tasks which are impractical or impossible can be accomplished with HSI. For example, detection of chemical or biological weapons, bomb damage assessment of underground structures, and foliage penetration to detect troops and vehicles are just a few potential HSI missions.

Hyperspectral imaging technology uses hundreds of very narrow wavelength bands to "see" reflected energy from objects on the ground. This energy appears in the form of "spectral fingerprints" across the light spectrum; enables collection of much more detailed data; and produces a much higher spectral resolution of a scene than possible using other remote sensing technologies.

Once these fingerprints are detected, special algorithms—repetitive, problem-solving mathematical calculations—then assess them to differentiate various natural and manmade substances from one another. "Signature" libraries may also be used to identify specific materials—e.g., rooftops, parking lots, grass, or mud—by comparing a library's pre-existing reference catalogs with freshly taken hyperspectral images of the battlefield from space.

Image processing equipment then portrays the various types of terrain and objects upon it in different colors forming a "color cube," each based on the wavelength of the reflected energy captured by the image. These colors are subsequently "translated" into maps that correspond to certain types of material or objects to detect or identify military targets such as a tank or a mobile missile launcher. Algorithms can also categorize types of terrain and vegetation (useful, for example, in counter-narcotic operations), detecting features such as disturbed soil, stressed vegetation, and whether the ground will support the movement of military vehicles.

Using this technology, theater commanders can use mobile ground stations to process in real-time information transmitted by the satellite, which will allow theater commanders to keep pace with rapidly changing conditions.

Due to the large amount of data associated with HSI technology, analyzing and displaying this data is difficult and processor intensive. Clearly, there is a need for a method that can convert the large amount of data associated with HIS technology to a compact and efficient file structure that will ease the analysis and presentation of the data.

SUMMARY OF THE INVENTION

In one aspect of the invention, a method for target detection in a hyperspectral image is provided comprising the steps of loading the hyperspectral image into computer readable memory. A database is generated based upon the hyperspectral image wherein the database comprises a shape file portion, a hyperspectral global data portion and a hyperspectral segment data portion. A target spectrum is compared to the hyperspectral segment data and the location of a match between said target spectra and said hyperspectral segment data is determined. Finally, the location of the targets is displayed.

In another aspect of the present invention, a method for the compression of an Adaptive Background/Foreground Analysis (AFBA) hyperspectral image database is provided comprising the steps of reading the AFBA database into computer readable memory for processing, wherein the AFBA database comprises a file header portion, a global data portion and segment data records, and translating the AFBA database to a Spectral Geographic Information System (SGIS) database, wherein the SGIS database comprises a shape file portion, a hyperspectral global data portion and a hyperspectral segment data portion.

In yet a further aspect of the invention a method for the computer based analysis of hyperspectral images is provided comprising the steps of loading a hyperspectral image into memory for processing by the computer. A computer readable database is created based on the hyperspectral image wherein the database comprises a shape file portion, a hyperspectral global data portion and a hyperspectral segment data portion.

In a further aspect of the invention a computer program product, tangibly stored on a computer-readable medium, for the analysis of hyperspectral images is provided comprising instructions operable to cause a programmable processor to open and read a digital image file containing hyperspectral spectra information associated with a predetermined geographic location and then generate a database associated with the digital image file, the database comprising a shape file portion, a hyperspectral global data portion and a hyperspectral segment data portion.

In yet a further aspect of the invention a method for the analysis of a hyperspectral image is provided comprising the steps of reading the hyperspectral image into computer readable memory for processing, wherein the hyperspectral image comprises a plurality of pixels, each pixel comprising predetermined spectral data. Next the hyperspectral image is translated into a database file, wherein the database file comprises a shape file portion, a hyperspectral global data portion and a hyperspectral segment data portion. Following this, an endmember spectrum is selected wherein the endmember spectrum is representative of a predetermined military target and a match between the endmember spectra and the hyperspectral segment data portion is located.

In a further aspect of the invention a method for the translation of an Adaptive Background/Foreground Analysis (AFBA) database to a Spectral Geographic Information System (SGIS) database is provided comprising the steps of loading the AFBA database into computer readable memory and converting the AFBA database to an SGIS database. The conversion further comprises the steps of writing a global header portion to computer readable memory and then writing segment data to the computer readable memory, wherein the segment data is representative of each record contained in the AFBA database. Finally, a shape file header portion and a shape file index portion are written to the computer readable memory.

These and other features, aspects and advantages of the present invention will become better understood with reference to the following drawings, description, and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The system described herein is suitable for use with Hyperspectral Imaging (HIS) applications where the collection of geographic imaging data is used for the location of specific target types. More specifically, the system lends itself particularly well to the identification and location of military targets typically associated with air to ground geographic imaging technology.

The system described herein differs from the prior art because it provides a means to translate large graphic image data files into a compact, highly efficient database file structure that provides for the real time analysis and display of hyperspectral image data.

Figure 1:
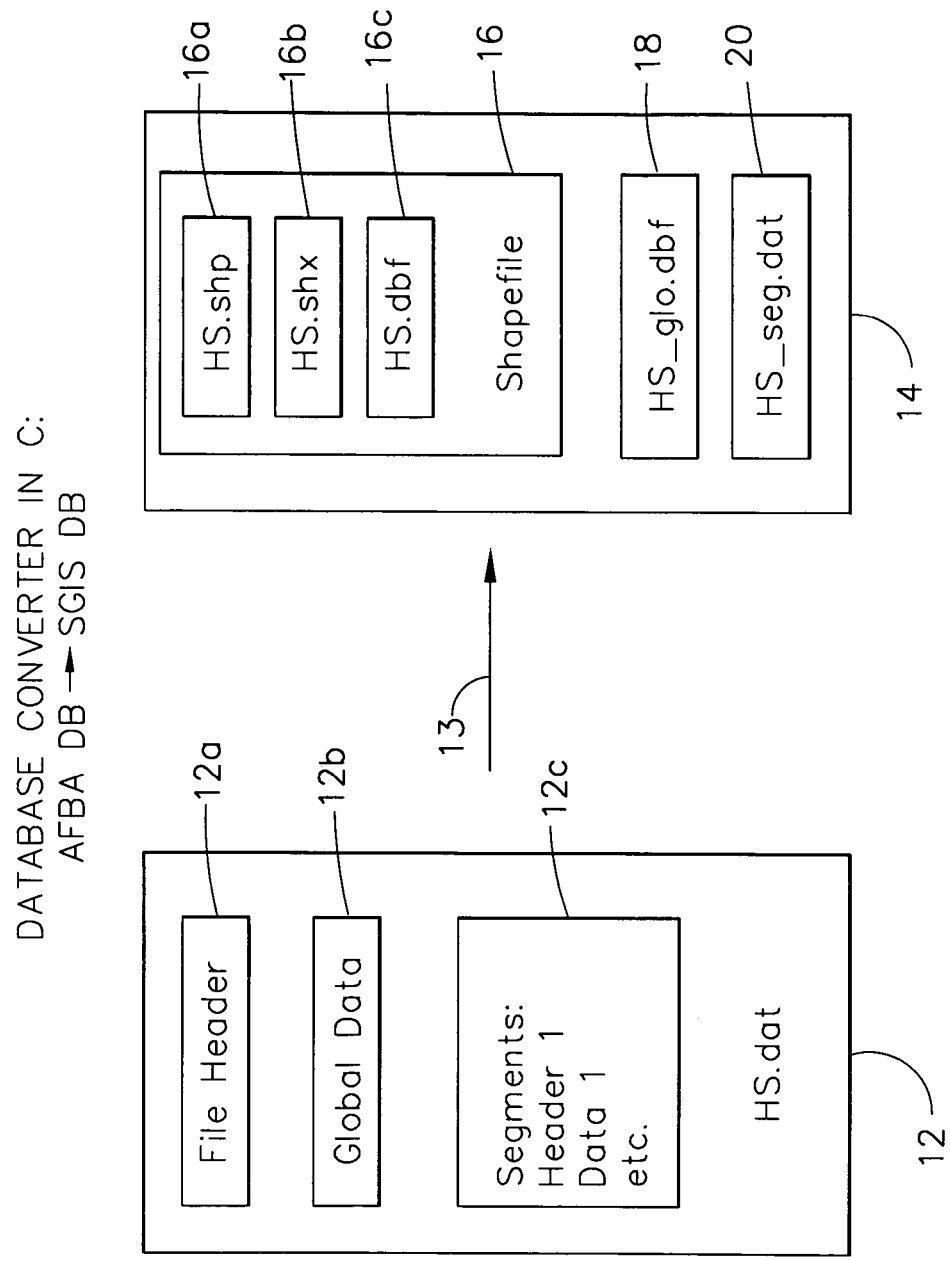
FIG. 1 is a flow diagram of a database translation in accordance with an embodiment of the invention.

Referring to FIG. 1 which shows a block diagram for the conversion of a hyperspectral geographic image database. Current imaging technology captures the image data in a database structure for analysis by a technique commonly referred to as Adaptive Foreground/Background Analysis (AFBA) which can be described as a three-dimensional cube having RGB and grayscale image data. The AFBA database structure is shown as block 12. The AFBA database typically may comprise a file header 12a, a section of global data 12b and an array of image data or segment data 12c. This database is typically very large and can be of the order of 260 megabytes in size. A translator 13 may be provided that transforms the large image database to a more efficient and much smaller Spectral Geographic Information System (SGIS) file which facilitates the rapid analysis and display of information. An SGIS database structure 14 may be comprised of a shape file portion 16, a hyperspectral global data portion 18 and hyperspectral segment data portion 20. The shape file portion 16 may be comprised of a shape library 16a, a shape index 16b and a hyperspectral database portion 16c. The shape library 16a may contain an array of polygons which may be used to describe the map image to be analyzed. The shape index 16b acts as the index to the polygon shapes contained in the library 16a and the hyperspectral database portion may be a database format file that locates the polygons to generate the map image to be analyzed.

Figure 2:
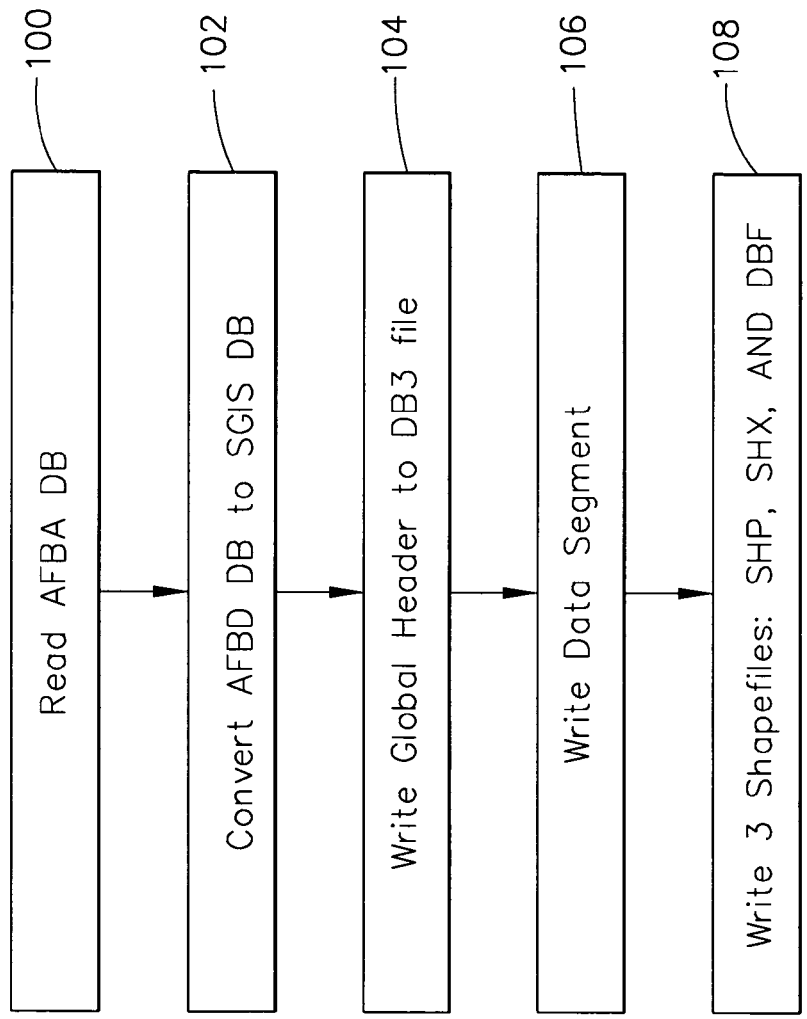
FIG. 2 is a top level flow control diagram of a database converter in accordance with an embodiment of the invention.

FIG. 2 shows the translation of the AFBA database to the SGIS database in more detail. At block 100, the AFBA database 12 is read into memory. Each record of this database may include information which describes the geographic image and may include header data, spectral channel data, image targets, and image endmembers. Image target data may further include segment data such as segment vertices, channel indices, target indices, endmember indices, target-to-endmember match indices, target abundances and end member abundances. At block 102, the rather large AFBA database is converted to the smaller more efficient SGIS database. At block 102, a file header portion is generated. For each record of the AFBA database 12, the translator 13 takes the number of vertices and the coordinates of the vertices to generate the shape file portion 16 of the SGIS database. At block 104, the translator 13 creates the hyperspectral global data portion 18. This may require the translator 13 to write field names for each channel, wavelength and FWHM. The translator 13 may also add records to the SGIS database for each channel the channel number, the wavelength and the FWHM. The translator 13 will also create names for the targets and endmembers. The SGIS database structure may be of any well known type such as DB3 or the like.

At block 106, the translator 13 writes the segment data 20 to the SGIS database. Segment data 20 may comprise for each record of the image database the byte position, the segment pixel, vertices, channels, targets, endmembers, target-endmember matches, target abundances and endmember abundances.

At block 108, the translator 13 writes the shape file portion 16 to the SGIS database. First, the shape file library 16a is created. Then, for each record of the AFBA database 12, the polygon points and polygon parts that comprise the shape file library 16a are created and written to the SGIS database 14. Also for each record, the shape index 16b is generated and written to the SGIS database 14. Finally, the hyperspectral database portion 16c is created by first creating a database header and then for each record in the AFBA database the shape attributes are written as values in the SGIS database.

Figure 3A:
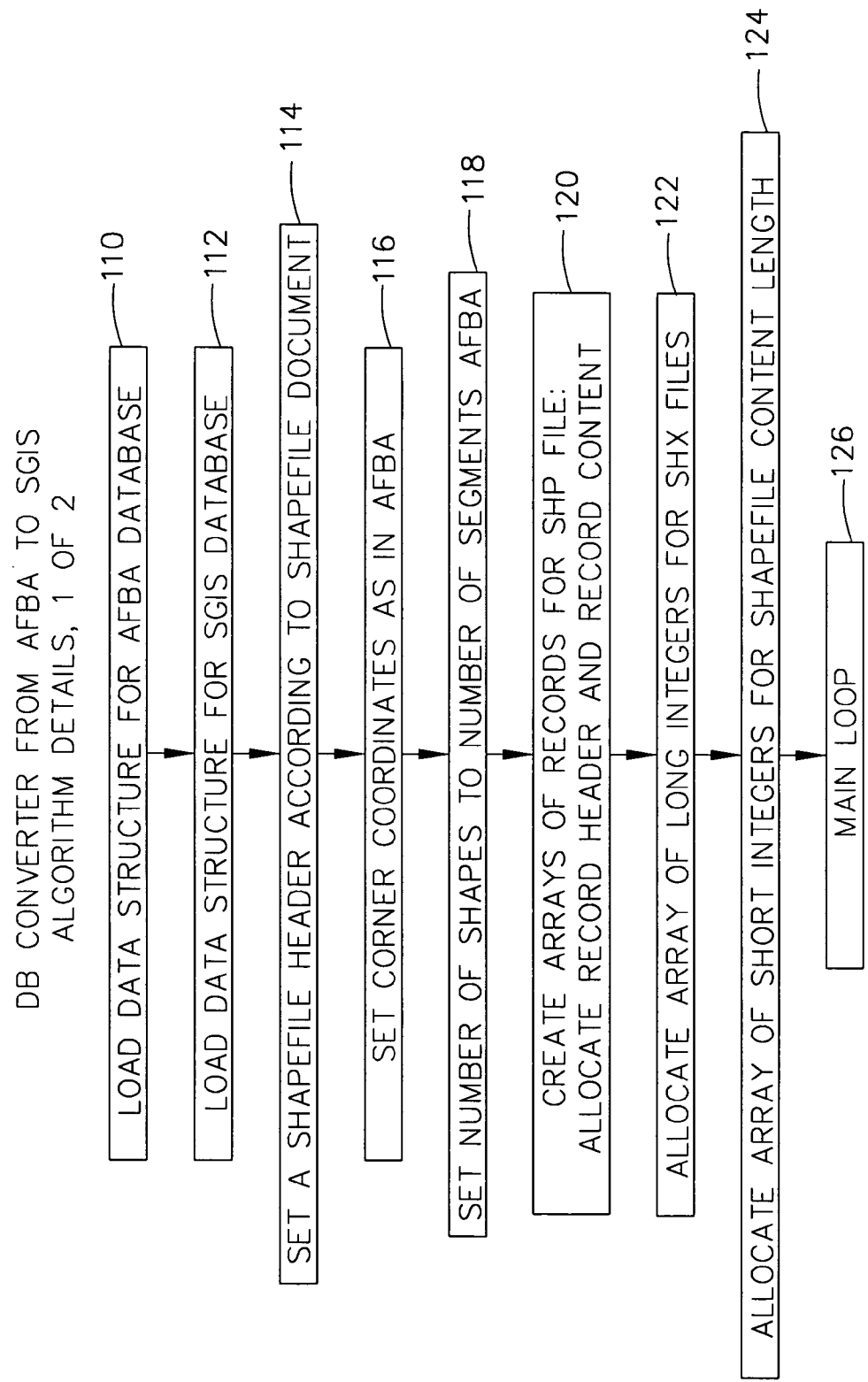
FIG. 3a is a detail block diagram of a hyperspectral image database converter in accordance with an embodiment of the invention.
Figure 3B:
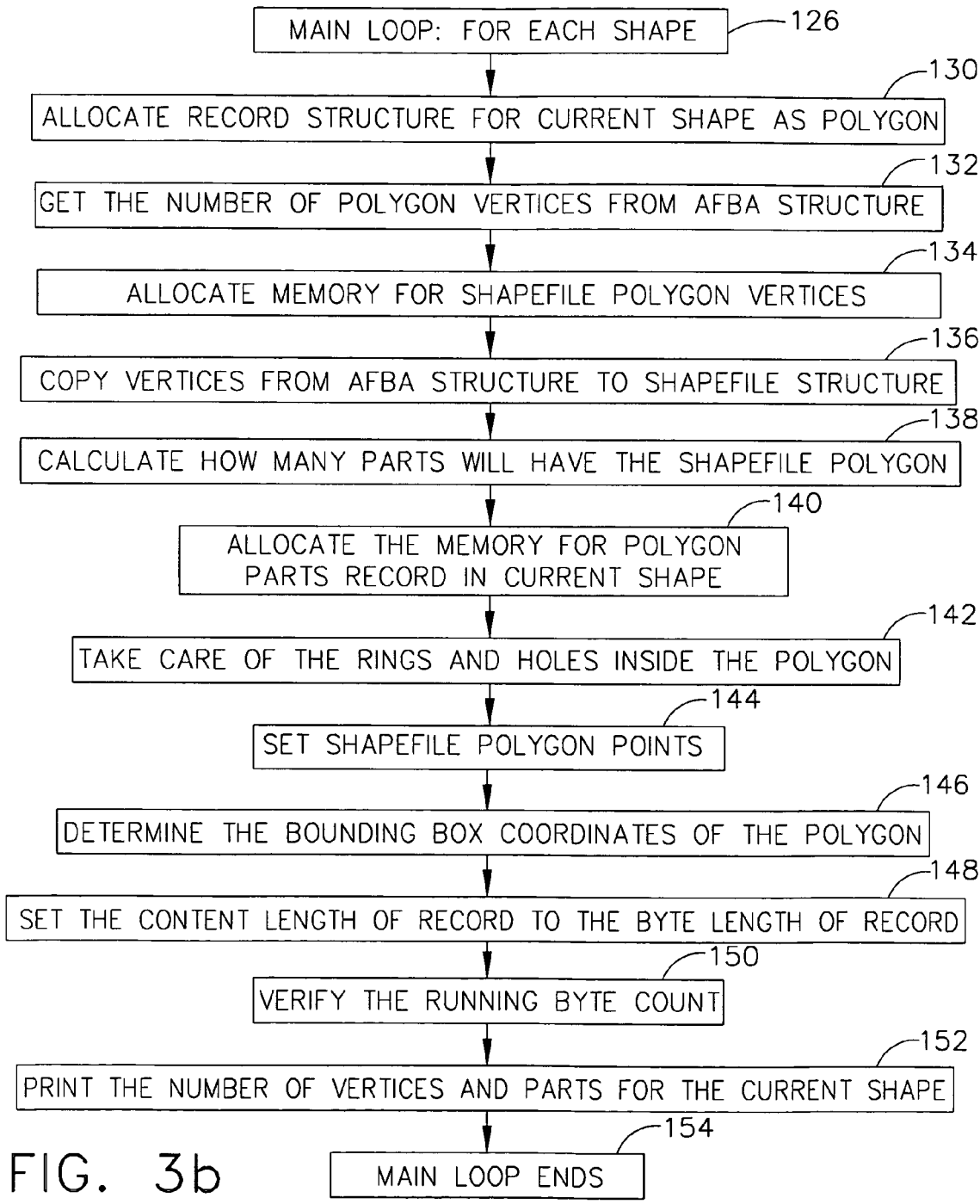
FIG. 3b is a continuation of a detail block diagram of a hyperspectral image database converter in accordance with an embodiment of the invention.

FIGS. 3a and 3b further describe the AFBA to SGIS conversion algorithm in still more detail. As mentioned previously, the AFBA database contains the data associated with a large geographic image file that may be analyzed by a computer to determine target locations. At block 110, the data structure of the AFBA database 12 is loaded. At block 112, the data structure for the SGIS database 14 is loaded. At block 114, the shape file portion 16 is created which includes the steps shown at block 116 where the corner coordinates of shape are determined based on the AFBA database. At block 118, the number of shapes in the SGIS database 14 is set to the same number of segments found in the segment data 12c in the AFBA database 12. At block 120, the array of records is created for the shape library 16a and space is provided to hold record header and record content for each shape. At block 122, a long integer array is created to contain the shape index 16b information. At block 124, a short integer array is created to contain the shape library 16a size. At block 126, the translator 13 enters a main loop which is repeated for each shape in the shape library 16a.

Referring now to FIG. 3b, the main loop 126 is described. For each shape, the translator 13 will cycle through the following steps to populate the SGIS database with the geographic imaging data. At block 130, for each shape, the database record structure is created. At block 132, the number of polygon vertices associated with the current shape is determined based on the data contained in the AFBA database 12. At block 134, memory is provided to contain the data associated with the polygon vertices. At block 136, the vertices data contained in the AFBA database 12 is translated to the shape file structure 16 of the SGIS database. At block 138, the image data from the AFBA database 12 is analyzed to determine the number of times the current polygon can be used in the geographic data being converted. At block 140, record space in the SGIS database is allocated to contain the data associated with the polygon placement based on the image data. At block 142 rings, holes, or both, that may be contained in the polygon are repaired to form a continuous planar polygon with no voids. At block 144, the points associated with the polygon are set in the shape file 16 and at block 146 the coordinates of the bounding box which determines the actual shape of the polygon are determined. At block 148 the length of the database record is determined and set by the byte length of the polygon and at block 150 error checking is performed and this is verified by checking the cumulative running byte count. At block 152 the number of vertices and locations of the current shape are written to the SGIS database. At block 154, the translator 13 returns to the beginning of the main loop 126 and repeats for each shape found in the shape library 16a.

Figure 4:
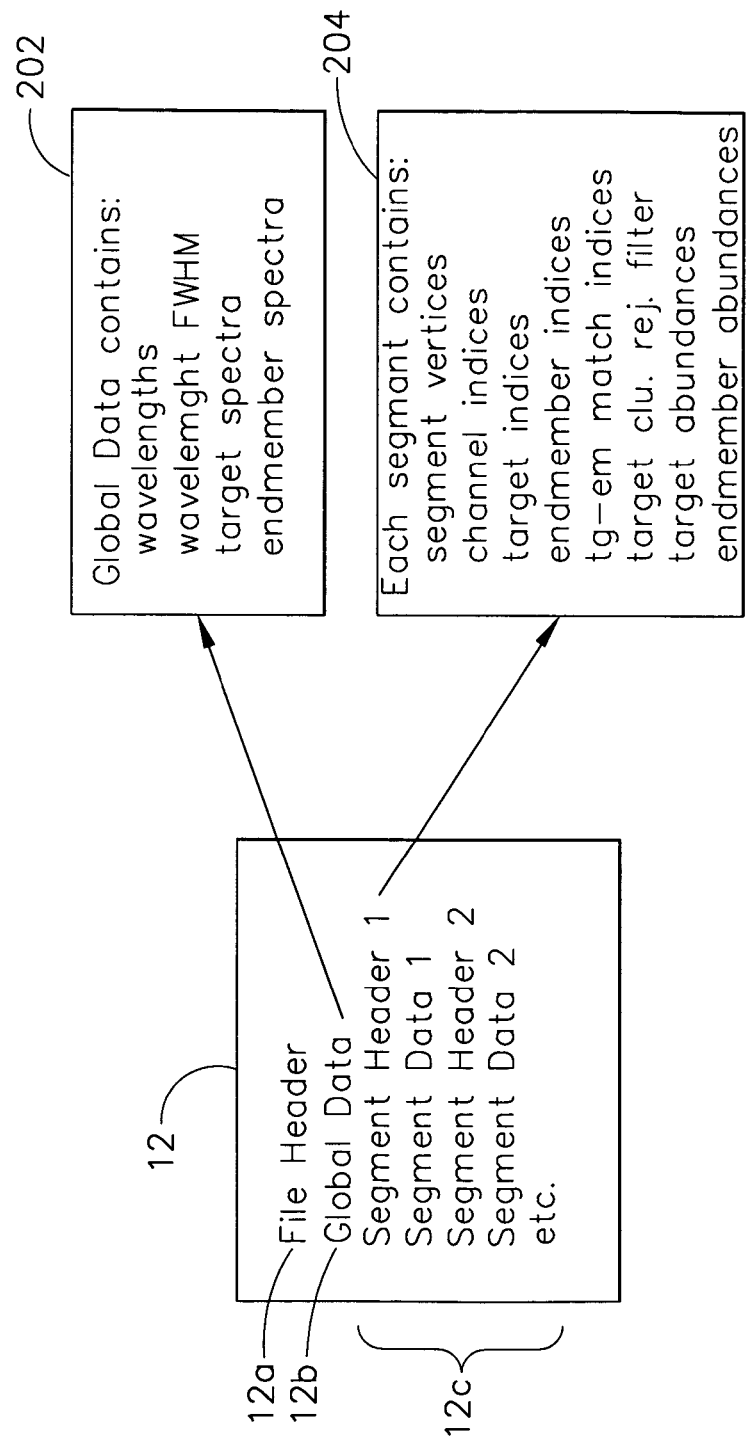
FIG. 4 is a block diagram of a hyperspectral image database interface in accordance with an embodiment of the invention.

As shown in FIG. 4, the AFBA database 12 may contain the file header portion 12a, the global data portion 12b and the segment data 12c. The global data portion 12b is shown in more detail at block 202 and may comprise wavelength data, wavelength Full-Width Half-Maximum (FWHM), target spectra which describe the targets being searched for and endmember spectra. The segment data 12c is shown in more detail at block 204 and each segment may contain segment vertices, channel indices, target indices, endmember indices, target to endmember match indices, target cluster rejection filter, target abundances and endmember abundances.

Figure 5:
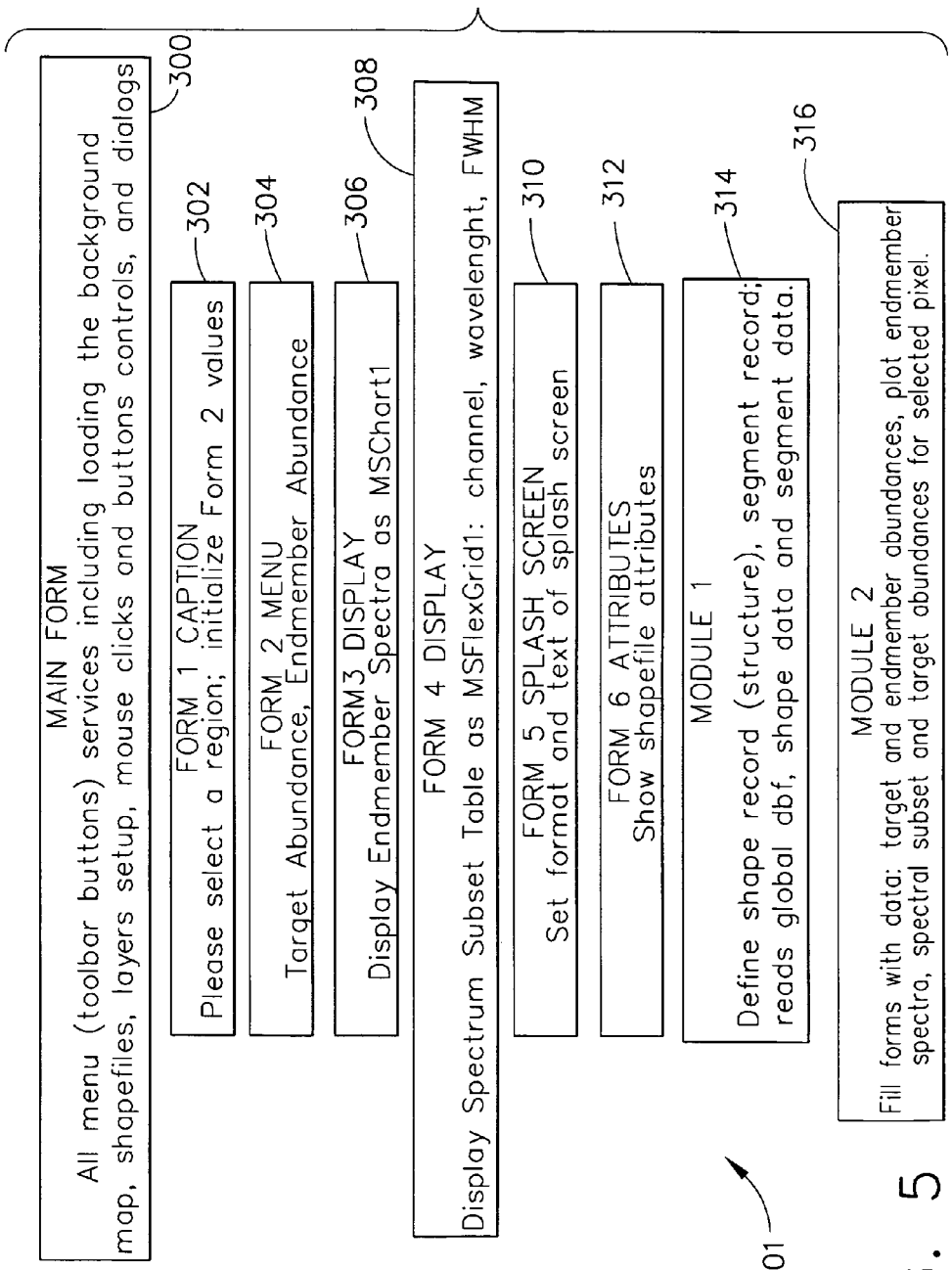
FIG. 5 is a block diagram of the various software modules for the analysis and display of hyperspectral images in accordance with an embodiment of the invention.

Referring now to FIG. 5 a software program 301 is shown which comprises various software modules that may comprise a graphical user interface (GUI) for use on a computer which allows for the analysis and display of the image data associated with the SGIS database 14.

At block 300, a main form is provided which allows the user to select from a number of menu choices which provides the services that may load the SGIS database 12 and display the background map, shapes, and set up the layers, and generally act as the starting point for the creation and analysis of the SGIS database 14.

At block 302, form 1 is provided which allows a user to select the region of a map image-to be analyzed. Typically the user may use a mouse to click and drag a box to determine the region of a map the user wishes to analyze. Based on this selection, at block 304 a menu is displayed to the user which indicates the target abundances and endmember abundances that are contained in the region selected in block 302. At block 306, the endmember spectral data associated with the selected region may be displayed as a chart for further analysis. At block 308, a table of data may be displayed which shows the channel, wavelength and FWHM of each endmember in the selected region. At block 310 the user may change the look and contents of the splash screen associated with program 301. At block 312, the shape attributes associated with the selected region may be displayed. At block 314, module 1 is provided which performs the various conversion and analysis functions of the program 301. These functions, as previously discussed, may include determining the shape record structure, the segment records, reading the global data, shape data and segment data. At block 316, module 2 is provided which also performs various conversion and analysis functions and may include determining target and endmember abundances, endmember spectra, spectral subsets and target abundances. Module 2 also displays the forms of data previously described.

Figure 6:
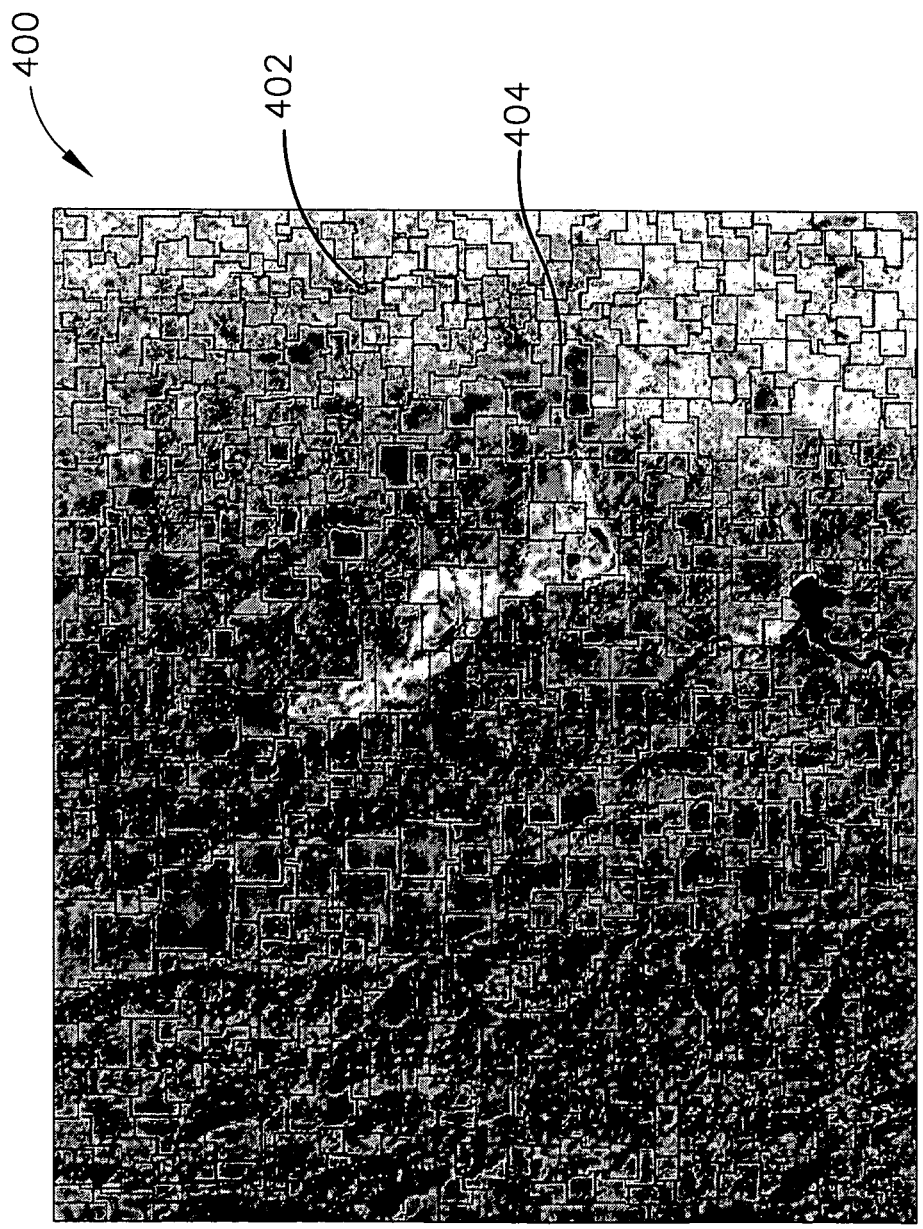
FIG. 6 is a typical screen shot of an image of a hyperspectral geographic image database in accordance with an embodiment of the invention.

Referring to FIG. 6, a typical screen shot of a geographic map image 400 is shown. As can be seen, this image 400 comprises an underlying background map 402 which may be a grayscale or RGB image captured for analysis. An array of shapes or polygons 404 are displayed onto the map 402 based upon the SGIS conversion. The location and orientation of the shapes 404 are also determined by the SGIS conversion.

Figure 7:
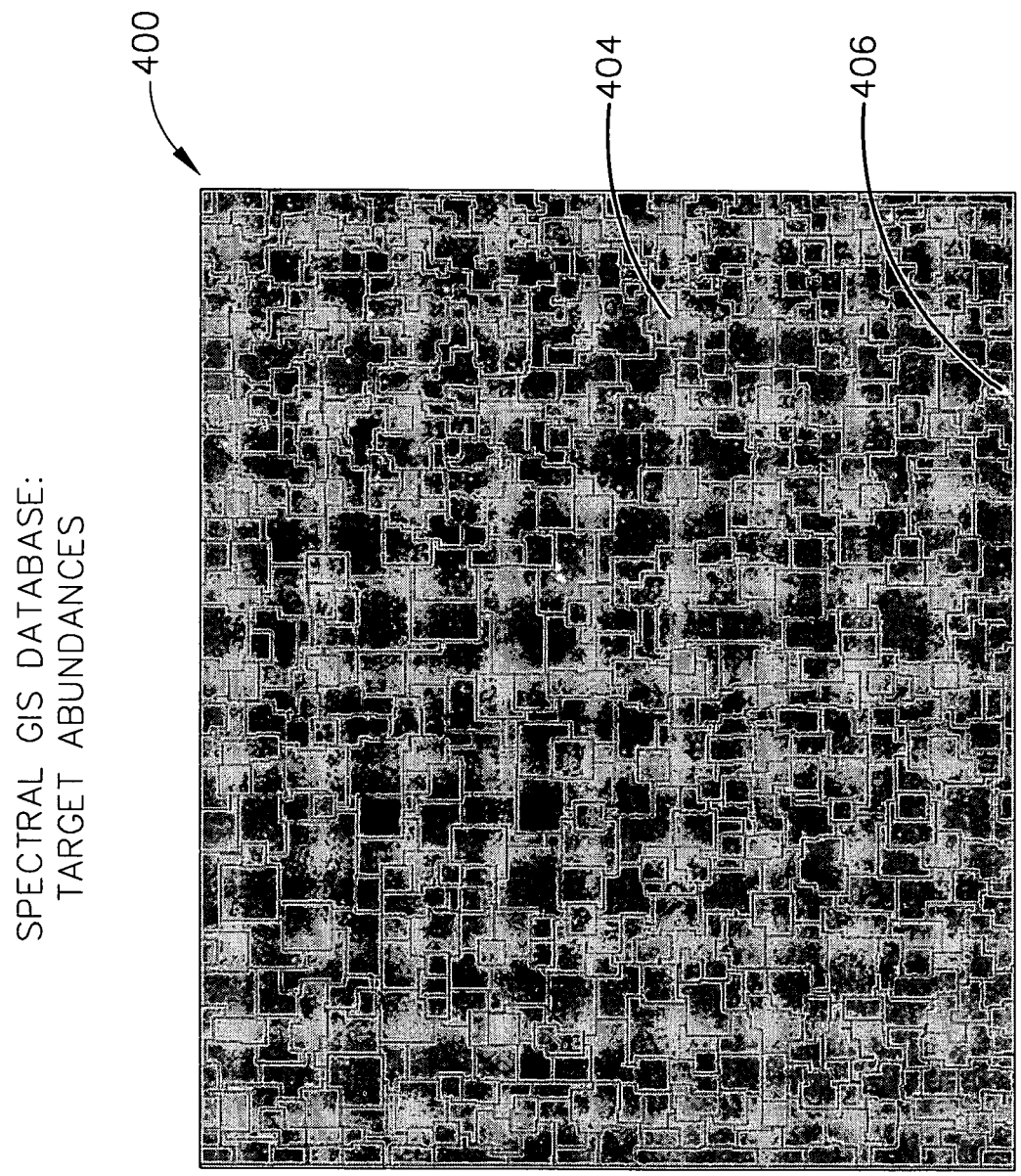
FIG. 7 is a typical screen shot of an image of a hyperspectral geographic image database with target locations identified in accordance with an embodiment of the invention.

FIG. 7 shows the location of specific targets 406 based on the criteria established by the endmember spectral data criteria that was preselected by the user. The SGIS database 14 is analyzed to determine the location on the map 402 (FIG. 6) of targets that match the endmember spectral criteria that may be established in the program 301. In this manner, the user can select a predetermined target based on endmember spectral data criteria and quickly locate areas of a map that match the selected endmember spectral data criteria. The exact longitude and latitude of each occurrence of a target can then be determined.

It should be understood, of course, that the foregoing relates to exemplary embodiments of the invention and that modifications may be made without departing from the spirit and scope of the invention as set forth in the following claims.

We claim:

1. A method for detection of a target in a hyperspectral image, the method comprising the steps of:
    loading the hyperspectral image, stored in an Adaptive Background/Foreground Analysis database (ABFA database), into computer readable memory;

generating a Spectral Geographic Information System database (SGIS database) based upon the hyperspectral image, wherein the SGIS database comprises a shape file portion, a hyperspectral global data portion and a hyperspectral segment data portion, wherein generating comprises:
  loading a data structure of the SGIS database;
  creating the shape file portion by determining corner coordinates of shapes based on the AFBA database;
  setting a number of shapes in the SGIS database to a same number of segments found in segment data in the AFBA database;
  creating an array of records for a shape library, wherein space is provided to hold a record header and a record content for each shape;
  creating a long integer array to contain a shape index; and
  creating a short integer array to contain the shape library;
comparing a target spectra to the hyperspectral segment data of the SGIS database;
determining a location of a match between the target spectra and the hyperspectral segment data, and;
displaying the location of the target based on the match.

2. The method of claim 1, wherein creating the shape file portion further comprises generating a plurality of polygons for use in said shape file portion.

3. The method of claim 2, wherein the shape index acts as an index to the plurality of polygons.

4. The method of claim 1, wherein the location of the target is provided based on a latitude and a longitude of the target.

5. The method of claim 1, wherein the target spectra is based on spectral data from known military targets.

6. A computer program, tangibly stored on a computer readable medium, for analysis of hyperspectral images, the computer program comprising instructions operable to cause a programmable processor to:

load the hyperspectral image, stored in an Adaptive Background/Foreground Analysis database (ABFA database), into computer readable memory;
  generate a Spectral Geographic Information System database (SGIS database) based upon the hyperspectral image, wherein the SGIS database comprises a shape file portion, a hyperspectral global data portion and a hyperspectral segment data portion, wherein generating comprises:
    loading a data structure of the SGIS database;
    creating the shape file portion by determining corner coordinates of shapes based on the AFBA database;
    setting a number of shapes in the SGIS database to a same number of segments found in segment data in the AFBA database;
    creating an array of records for a shape library, wherein space is provided to hold a record header and a record content for each shape;
    creating a long integer array to contain a shape index; and
    creating a short integer array to contain the shape library;
  compare a target spectra to the hyperspectral segment data of the SGIS database;
  determine a location of a match between the target spectra and the hyperspectral segment data, and;
  display the location of the target based on the match.

7. The computer program of claim 6 wherein the computer program comprises further instructions operable to cause the programmable processor to display the shape file portion over a digital image file containing the hyperspectral data.

8. The computer program of claim 6 wherein the computer product comprises further instructions operable to cause the programmable processor to display a latitude and a longitude location of the match.

9. The computer program of claim 6 wherein said target spectra is representative of a predetermined military target.

* * * * *